United States Patent [19]

Kaneda

[11] 4,274,287
[45] Jun. 23, 1981

[54] METHOD FOR MEASURING UNBALANCED WHEELS OF AN AUTOMOTIVE VEHICLE

[75] Inventor: Reiken Kaneda, Kawasaki, Japan

[73] Assignee: Kohgiken Corporation, Tokyo, Japan

[21] Appl. No.: 106,085

[22] Filed: Dec. 21, 1979

[30] Foreign Application Priority Data

Dec. 28, 1978 [JP] Japan ................................ 53/161233

[51] Int. Cl.³ ............................................. G01M 1/28
[52] U.S. Cl. .......................................... 73/457; 73/459
[58] Field of Search ................. 73/457, 459, 462, 465, 73/466

[56] References Cited

U.S. PATENT DOCUMENTS

| | | | |
|---|---|---|---|
| 3,762,225 | 10/1973 | Müller | 73/457 |
| 4,046,017 | 9/1977 | Hill | 73/462 |

FOREIGN PATENT DOCUMENTS 2518459 11/1975 Fed. Rep. of Germany ............. 73/462

*Primary Examiner*—James J. Gill

[57] ABSTRACT

A method for measuring unbalanced wheel of an automotive vehicle according to so-called "on the car" system which does not require detaching a wheel from car body for the measurement but providing car-carrying type detector under a car on the spot. In order to provide a novel method of measuring the complete dynamic balance, two detectors respectively support the car body from under an imaginary line connecting both centers of left and right wheels. Then co-related factors, $l_1$, $l_2$ and $l_3$ which are distance between said two detectors, distance between one of said detectors and an inside surface of a rotating wheel and distance between said inside surface of the wheel and the outside surface thereof respectively are taken into a calculation to provide detected values of unbalance acting on said inside and outside surfaces of said left and right wheels.

4 Claims, 9 Drawing Figures

METHOD FOR MEASURING UNBALANCED WHEELS OF AN AUTOMOTIVE VEHICLE

BACKGROUND OF THE INVENTION

The present invention relates to a method for measuring unbalanced wheels of an automotive vehicle, more particularly to a method for measuring unbalanced car wheels by means of examination of two points located under an imaginary axis line connecting both centers of the right and left car wheels.

Generally speaking, there are two ways of measuring unbalanced car wheels during rotation of same. One way is a so-called "off the car" system whereby the wheels must be taken off the car for measurement and the other way is a so-called "on the car" system whereby measurement is carried out on the spot without detaching the wheels from the car. The former way, that is the "off the car" system has a merit of high accuracy for detecting an unbalanced wheel itself, but when the wheel is attached to the car again, some difference in wheel axis alignment and axis of a measuring apparatus may occur, so that the "off the car" system may not be satisfactory. On the other hand, the latter way, that is the "on the car" system, has a merit that examination can be carried out without detaching the wheel from the car body, but measurement accuracy according to this system is inferior to the "off the car" system.

There are two types of "on the car" systems, namely, the soft-type and hard-type. An example of the soft-type is shown in FIG. 1A, where a wheel W raised by a jack J vibrates around a point A of a car body due to centrifugal force generated by the unbalanced wheel. The amplitude of the vibration is detected by a detector S and electrically analyzed to display the amount and location of the unbalance.

In the above-mentioned case, it is obvious that the magnitude and location of the vibration are respectively different depending upon structure of suspensions which support the wheels. Therefore, the indicated amount of unbalance may be an approximate value. The position of the attached weight is an intermediate point in the case where forward and reverse rotations of a wheel are carried out in turn. The hard-type is shown in FIG. 1B, where forces f. and -f, generated by an unbalanced wheel are detected by a car-carrying type detector S' with respect to a supporting point B at an opposing wheel. The magnitude of vibration of a wheel according to the hard-type is very small and therefore, the following equation exists with respect to centrifugal force f and detected force R; i.e.

$$R = l_1/l_2 f$$

and the suspension structure hardly affects phases because of the hard-type. Therefore, the accuracy of measurement of this case is good, but true correction of a wheel cannot be obtained, because a dynamic unbalance of a rotating body is considered to be a result of at least the following two important dynamic unbalance factors. Namely, one is static unbalance which occurs when the breadth of the rotating body is thin and the center of gravity and the axis of rotation does not coincide with each other. The other is couple unbalance which occurs when the rotating body has a considerable breadth and the center of gravity is on the axis line of the rotating body, but one of the main axes of inertia passing through the center of gravity is declined to the axis of rotation. The so-called dynamic unbalance is, for example, in the case of car wheels, which is a result of the above-mentioned static unbalance and couple unbalance with respect to a rotating body having a considerable breadth.

Taking the respective factors of unbalance into consideration, the hitherto known methods for measuring rotational unbalance providing only a one-point detecting portion according to the "on the car" system is insufficient in principle, as both soft- and hard-type are analyzed as follows referring to FIG. 2.

Assuming that, $f_1, f_2$ = centrifugal forces due to unbalance,
$F$ = centrifugal force due to correction weight,
$R_1$ = detected force
then $$\vec{f_1}(l_1 + l_2 + l_3) + \vec{f_2}(l_1 + l_2) = \vec{R_1} \times l_1 \tag{1}$$

when a correction weight is mounted, then $$(\vec{f_1} + \vec{F})(l_1 + l_2 + l_3) + \vec{f_2}(l_1 + l_2) = \vec{R_1} \times l_1 \tag{2}$$

if $R_1 = 0$, then the static unbalance has been considered to be corrected. However, as seen in the above equations of (1) and (2) referring to FIG. 2, the sum of the centrifugal forces merely shows zero. It is obvious that the static unbalance and couple unbalance have not been corrected yet. For example, if we make $\vec{f_1} = -\vec{f_2}$, then the static unbalance becomes zero, but if we substitute $f_2$ into the above (1) equation, then we obtain $$\vec{f_1} \times l_3 = \vec{R_1} \times l_1,$$

$$R_1 = \vec{f} \times (l_3/l_1)$$

which, of course, is not zero. This does not mean that we have detected static unbalance.

On the other hand, as for couple force, if $\vec{f_1} = \vec{f_2}$ then the couple unbalance should become zero, but if we substitute $f_2$ into the above mentioned equation (1), then we obtain $$f_1(2l_1 + 2l_2 + l_3) = \vec{R_1} \times l_1$$

$$\vec{R_1} = f_1(2l_1 + 2l_2 + l_3/l_1)$$

which is not zero. This means we have not as yet detected moment unbalance.

From the foregoing description, it is clear that the hitherto known "on the car" system of the balance testing apparatus is a correction system around a supporting point (A or B in FIG. 1A, FIG. 1B), so that it is an insufficient system as the balancing condition is not satisfied.

SUMMARY OF THE INVENTION

An object of the present invention is to provide a novel method of measuring the complete dynamic balance of wheels of an automotive vehicle by supporting two points in the vicinity of both ends of an imaginary line of an axis which connects central points of right and left wheels in the direction of the axis with a detecting apparatuses which supports the car body as well and by calculating of co-related factors, namely the distance between the two points of the detecting appratuses, the distance from one point of the two points to wheels and depth of cars etc.

Hereinafter, the present invention will be described in detail referring to the accompanying drawings whereby FIG. 3 to FIG. 6 show embodiments of the invention.

DETAILED DESCRIPTION OF PREFERRED EMBODIMENTS

Figure 1A:
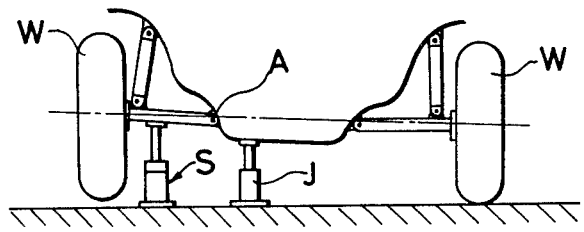
FIG. 1A and FIG. 1B show general views of hitherto known examples for measuring unbalanced wheel.
Figure 1B:
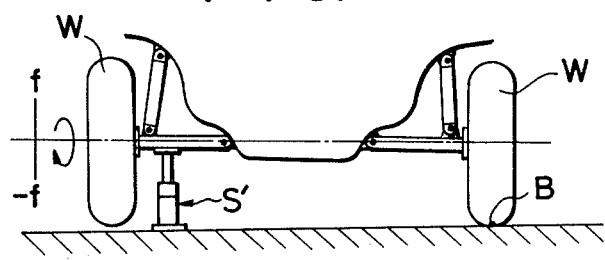
Figure 2:
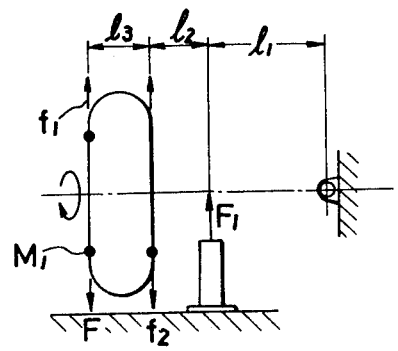
FIG. 2 shows an explanatory view illustrating common principle of examples shown in FIG. 1A and FIG. 1B.
Figure 3A:
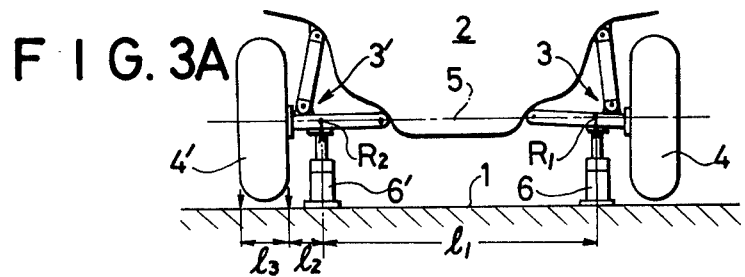
FIG. 3A and FIG. 3B show general view of embodiments according to the present invention.
Figure 4A:
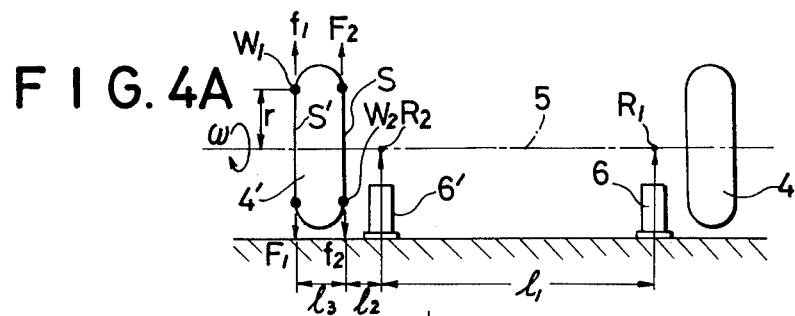
FIG. 4A shows an explanatory view illustrating common principle for each embodiments according to the present invention.
Figure 5:
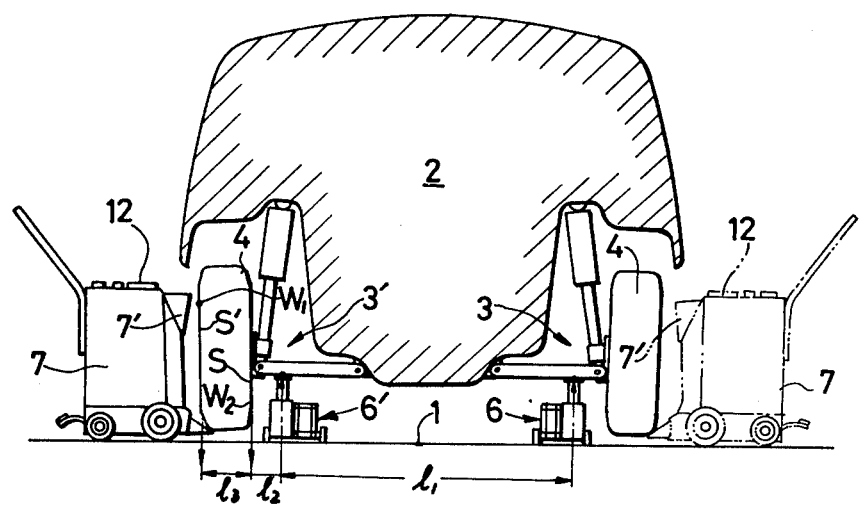
FIG. 5 shows an embodiment of FIG. 4A.

In an embodiment shown in FIG. 3A, FIG. 4A and FIG. 5, an imaginary line 5 connects the center of left wheel 4 with the center of right wheel 4' in axial direction. The wheels 4 and 4' are actually connected with left and right suspensions 3 and 3' of a car body 3 above the earth 1. In this case, camber angle is neglected, because it is negligible small. Actually, the imaginary line 5 is deemed to be equivalent to rigid axis line, because it is actually consisted of suspensions connected to left and right sides of the car body, where elastic car-supporting force is superior to detected force due to measurement. Two detectors 6 and 6' which also serve for carrying the car body are provided under said imaginary line 5. Then the following equations are obtained referring to the embodiments shown in FIG. 3A.

$$\vec{f_1} = (l_1 + l_2)R_1 + l_2 \times R_2/l_3 \quad (3)$$

$$\vec{f_2} = (l_1 + l_2 + l_3)R_1 + (l_2 + l_3)R_2/l_3 \quad (4)$$

wherein,
$l_1$ = distance between the detectors 6 and 6'
$l_2$ = distance between the detector 6' and wheel 4'
$l_3$ = breadth of the wheel 4'
$\vec{f_1}, \vec{f_2}$ = centrifugal force due to unbalance
$\vec{F_1}, \vec{F_2}$ = centrifugal force due to correction weight
$W_1, W_2$ = amount of unbalance weight
hence, $\vec{F_1} = -\vec{f_1}, \vec{F_2} = -\vec{f_2}$ so that above equations (3) (4) can be obtained.

Here, only $f_1$, $f_2$ are unknown. Other factors are known, because $l_1$, $l_2$ and $l_3$ are determined conditions, $R_1$ and $R_2$ are detected values. So that we can obtain the values of $f_1$ and $f_2$ which in turn give amount of unbalance to be corrected and relative locations accordingly. Therefore, exact measurement can be carried out.

Figure 4B:
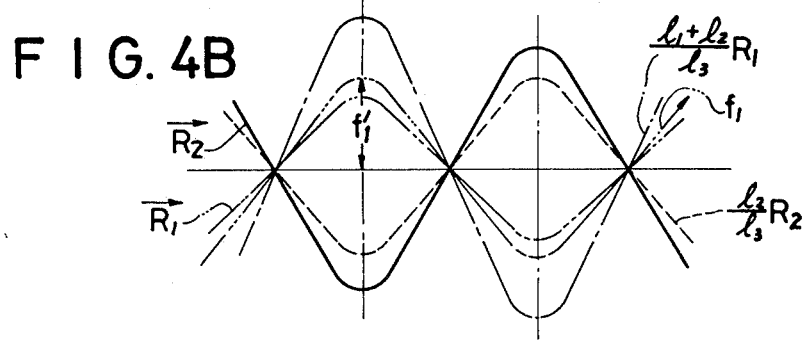
FIG. 4B shows measured curves according to the principle of FIG. 4A.

Referring to FIG. 4A and 4B, $\vec{R_1}$ and $\vec{R_2}$ in equations (3) and (4) are detected and always shown as sine curves, so that sine curves of $R_1$ and $R_2$ shown in equations (3) and (4) are obtainable and sine curves of $\vec{f_1}$ and $\vec{f_2}$ are obtainable accordingly.

Therefore, $\vec{f_1}$ in FIG. 4 can be obtained. The peak value $f_1'$ is given by the following equation.

$$\vec{f_1}' = (W_1/g)\omega^2 r \quad (5)$$

here g = gravity (9.8 m/s²), $W_1$ = amount of unbalance weight, $\omega$ = angular speed (proportional to number of revolution), r = radius of rotation of unbalance weight.

From equation (5), amount of unbalance weight $W_1$ is obtainable as, $$W^1 = g\omega^2 r f_1'$$

The location of unbalance weight is found by hitherto known measurement with eye employing conventional means, for example, such as stroboscopic radiation means through adequate electronic control circuit at the time when sine curve of $\vec{f_1}$ reaches at peak value or zero. Also the location of unbalance weight $W_2$ in the above equation of (5) can be obtained by a similar development to the way above mentioned.

Figure 6:
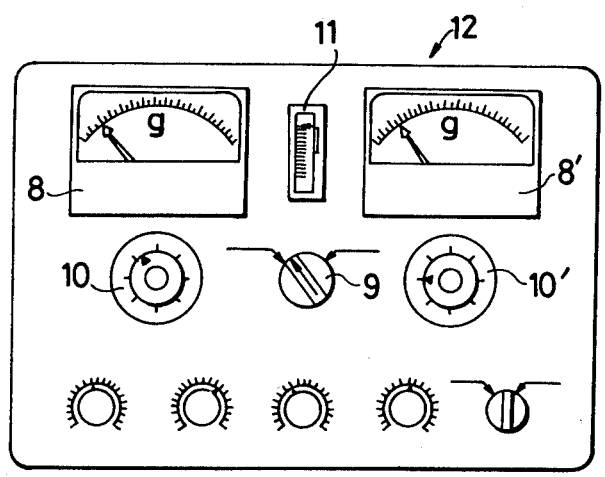
FIG. 6 shows an essential part of measurement apparatus in FIG. 5.

Actually, as shown in FIG. 6 each measurement is displayed on a operational panel 12 provided at the top of wheel unbalance measuring apparatus which is consisted of gram meters 8, 8', for outer and inner surfaces a selector switch 9, location memory dials 10, 10' and a speed meter 11, span meter, distance meter, diameter meter, width meter and spin meter switchable for left and right tires. When the selector switch 9 is operated, the selection of detection for inside or outside surface of the wheel 4' is made. Then unbalance location marks (not shown in the drawings) on the inside and outside surfaces of the wheels 4 and 4' are radiated by a stroboscopic device 7, watched by eyes and the similar locations are indicated by memory dials 10 and 10'. Thenafter correction weights $W_1$ and $W_2$ are attached to the wheels 4 and 4' at the right places. After finishing measurement of one of wheels 4 and 4', then the measurement device 7 is moved to the outside of the other wheel to measure.

Figure 3B:
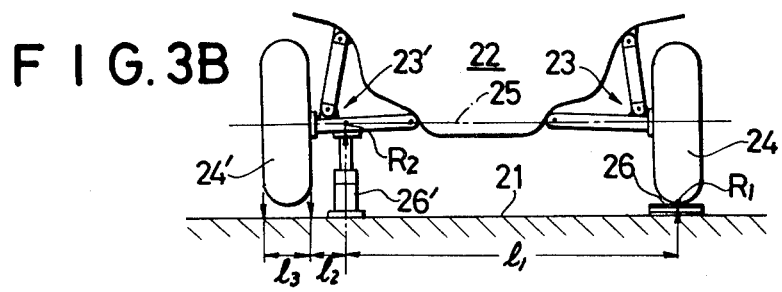

FIG. 3B shows the second embodiment according to the present invention, wherein only one side of axis line 25 connecting centers of both wheels 24 and 24' supported by left and right suspensions 23 and 23' of the car body 22 is supported by detector 26' which carries the car body as well, while another side of the axis line 25 is mounted on the surface of a wheel mounting detector 26 on the earth 21 in order to obtain relative ditances of $l_1$, $l_2$ and $l_3$.

The second embodiment has almost as same effect as the first embodiment has, and is especially applied to measure unbalanced rear wheels.

As stated above, in the hitherto known "on the car" system for measuring unbalanced wheel a detective portion is provided only at one point under a common axis line connecting the left and right wheel, so that measurement of unbalanced wheel only in the vertical direction has been possible. But according to the present invention, two points are provided to measure dynamic unbalance consisting of static unbalance and couple unbalance. The first embodiment shows additional advantage that both left and right wheels are lifted at the same time for measuring unbalance thereof, it is more efficient than the hitherto known way of measurement which required lifting one side of car body in turn. The second embody shows other advantage that it is especially applicable for measuring unbalanced wheels at rear side of car body.

What is claimed is:

1. A method for on-the car measuring of static and dynamic unbalance of the wheels of an automotive vehicle, said method comprising the steps of:

supporting the vehicle at two laterally spaced apart points of an imaginary axis that connects the center of the right and left wheels in a pair of wheels, the support being provided by a transducer at each point;

rotating the wheel to be balanced about the imaginary axes;

detecting oscillations in the wheel due to an unbalance thereof by means of the transducers;

measuring the distance between the two points on which the vehicle is supported;

measuring the distance between the inside surface of the rotating wheel and a first one of the two points on which the vehicle is supported;

measuring the distance between the inside and outside surface of the wheel; and applying a correction weight at the location determined by said detection step, the value of said correction weight being determined by the equations:

$$\vec{f_1} = (l_1 + l_2)R_1 + l_2 \cdot R_2$$

and $$\vec{f_1} = (l_1 + l_2 + l_3)R_1 + (l_2 + l_3)R_2$$

wherein:
$l_1$ = the distance determined by said first measuring step;
$l_2$ = the distance determined by said second measuring step;
$l_3$ = the distance determined by said third measuring step;
$\vec{f_1}$ and $\vec{f_2}$ = centrifugal forces due to unbalance; and
R = a detected force and by the equation:

$$w = g\omega^2 \, rf_1^1$$

wherein:
W = value of the unbalance weight
g = gravity (9.8 m/S$^2$)
$\omega$ = angular speed
r = radius of rotation of the unbalance weight
$f_1^1$ = peak value of $\vec{f_1}$ 2. The method according to claim 1 wherein all of said steps are repeated except for said second measuring step which is altered so that the measurement recited therein is taken between the outside surface of the rotating wheel and a first one of the two points on which the vehicle is supported.

3. The method according to claim 1 wherein said supporting step comprises the step of positioning support means adjacent the inside surface of two coaxial wheels in a pair.

4. The method according to claim 1 wherein said supporting step comprises the steps of positioning a first support adjacent the inside surface of one of two coaxial wheels in a pair and positioning a second support underneath the second of the two coaxial wheels in the pair.

* * * * *